(12) United States Patent
Wagner et al.

(10) Patent No.: US 7,533,511 B2
(45) Date of Patent: May 19, 2009

(54) BEVERAGE BOTTLING PLANT FOR FILLING BOTTLES WITH A LIQUID BEVERAGE MATERIAL HAVING A PACKING MACHINE AND A ROTATION MACHINE FOR ROTATING PACKED BOXES

(75) Inventors: Stefan Wagner, Xanten (DE); Hans-Gerd Ripkens, Goch (DE); Stefan Willemsen, Weeze (DE); Frank Nebel, Kleve (DE)

(73) Assignee: KHS Maschinen-Und Anlagenbau AG, Dortmund (DE)

( * ) Notice: Subject to any disclaimer, the term of this patent is extended or adjusted under 35 U.S.C. 154(b) by 4 days.

(21) Appl. No.: 11/262,516

(22) Filed: Oct. 28, 2005

(65) Prior Publication Data
US 2006/0130434 A1 Jun. 22, 2006

(30) Foreign Application Priority Data
Oct. 30, 2004 (DE) .................... 10 2004 052 784

(51) Int. Cl.
*B65B 21/02* (2006.01)
*B65B 7/28* (2006.01)
*B65G 47/244* (2006.01)

(52) U.S. Cl. .................... 53/167; 53/282; 198/411; 198/416

(58) Field of Classification Search .................... 53/253, 53/331.5, 317, 319, 282, 167, 251, 244, 247, 53/544, 446; 198/411, 416; *B65G 47/244*
See application file for complete search history.

(56) References Cited

U.S. PATENT DOCUMENTS

| | | | |
|---|---|---|---|
| 3,834,516 A | 9/1974 | Reeser | |
| 4,086,744 A * | 5/1978 | Seragnoli | 198/416 |
| 4,519,492 A | 5/1985 | Focke et al. | |
| 4,606,452 A * | 8/1986 | Lecrone | 198/411 |
| 4,930,615 A * | 6/1990 | Nash | 198/411 |
| 5,657,609 A * | 8/1997 | Spada et al. | 53/135.1 |
| 5,713,403 A * | 2/1998 | Clusserath et al. | 141/101 |
| 5,857,309 A * | 1/1999 | Cicha et al. | 53/167 |
| 5,893,259 A * | 4/1999 | Posge | 53/448 |
| 6,000,199 A * | 12/1999 | Boldrini | 53/466 |
| 6,012,267 A * | 1/2000 | Katsumata | 53/425 |
| 6,276,113 B1 * | 8/2001 | Bernhard | 53/253 |
| 6,868,873 B2 * | 3/2005 | Frisk | 141/11 |
| 2002/0066640 A1 | 6/2002 | Munsch | |
| 2004/0200190 A1 * | 10/2004 | Wagner et al. | 53/282 |

FOREIGN PATENT DOCUMENTS

| | | | |
|---|---|---|---|
| DE | 3043469 A1 | 3/1982 | |
| DE | 4036627 A1 | 5/1992 | |
| DE | 4100945 A1 * | 7/1992 | |

(Continued)

*Primary Examiner*—Stephen F Gerrity
(74) *Attorney, Agent, or Firm*—Nils H. Ljungman & Associates

(57) ABSTRACT

A beverage bottling plant for filling bottles with a liquid beverage material having a packing machine and a rotation machine for rotating packed boxes. The rotation machine includes a conveyor belt for conveying packages and a rotating wheel including downwardly extending elongated members which, when the wheel is rotated, are able to rotate packages about 90 degrees in their conveying direction.

20 Claims, 7 Drawing Sheets

FOREIGN PATENT DOCUMENTS

| | | | |
|---|---|---|---|
| DE | 4214321 A1 | | 11/1993 |
| DE | 10123081 C1 | * | 11/2002 |
| EP | 1179494 A1 | * | 2/2002 |
| EP | 1260465 A1 | * | 11/2002 |
| EP | 1 388 509 A | | 2/2004 |
| GB | 2 077 209 A | | 12/1981 |
| JP | 63 143114 A | | 6/1988 |
| SU | 1281488 A1 | * | 1/1987 |
| WO | WO 2004076319 A1 | * | 9/2004 |

* cited by examiner

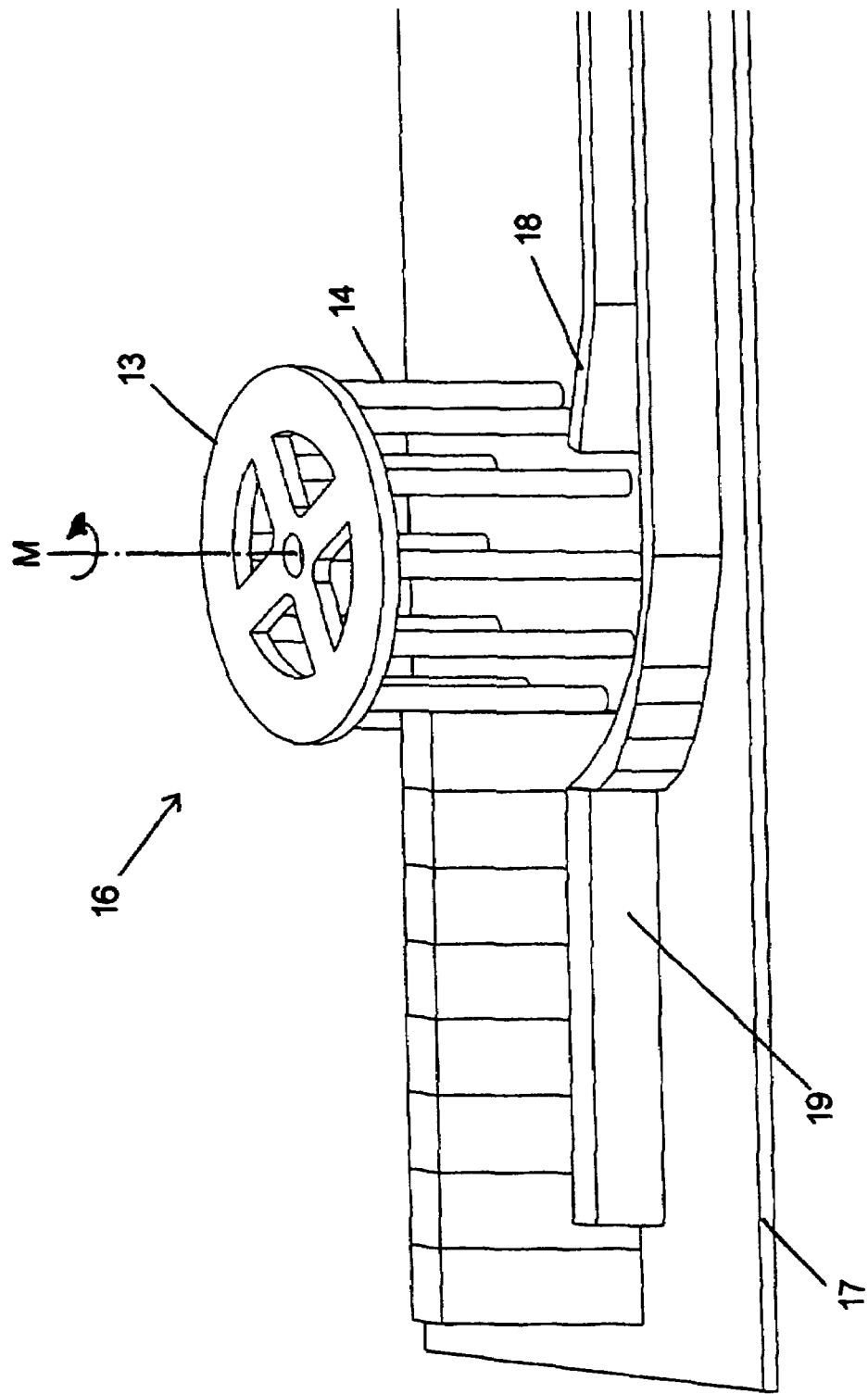

BEVERAGE BOTTLING PLANT FOR FILLING BOTTLES WITH A LIQUID BEVERAGE MATERIAL HAVING A PACKING MACHINE AND A ROTATION MACHINE FOR ROTATING PACKED BOXES

BACKGROUND

1. Technical Field

The present application relates to a beverage bottling plant for filling bottles with a liquid beverage material having a packing station and a rotation station for 2-cornered or n-cornered packages.

2. Background Information

A beverage bottling plant for filling bottles with a liquid beverage filling material can possibly comprise a beverage filling machine with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine. Upon filling, a closing station closes the filled bottles. There may further be provided a conveyer arrangement configured to transfer filled bottles from the filling machine to the closing station. Bottles may be labeled in a labeling station, the labeling station having a conveyer arrangement to receive bottles and to output bottles. The closing station and the labeling station may be connected by a corresponding conveyer arrangement.

A high percentage of retail products are packaged. Tetragonal packages with an essentially flat base surface represent the highest percentage of such products. These packages can be made, for example, of sheet metal, plastic and/or cardboard, paperboard or paper. There are few limitations with regard to the type of goods that can be packaged in these packages, so that almost all products such as, for example, flour, nails, rice, beverages etc. are sold in such packages. These goods are generally produced using mass-production methods which are oriented and optimized toward the production of large quantities, so that, for example, a large number of packages filled with a given product are manufactured in a given unit of time.

To minimize the investment costs and to keep the size of such production facilities as small as possible, it has been found to be particularly advantageous to transport the packages and packing units "end-to-end" as far as possible, i.e. without gaps or spaces between two packages. In this manner, the surface areas and thus also the lengths of the required conveyors can be significantly reduced. This measure likewise increases the stability of the packages as they are being transported.

In the context of the production process, it may be necessary to rotate the packages around their vertical axis for the next process or processing step, whereby in many cases a rotation by 90 degrees is desired.

DE 42 14 321 C2, for example, discloses a device to perform this task. With this device, packages are transported on their underside by conveyor belts that are positioned on opposite ends of this underside, whereby said conveyor belts can be operated at different speeds. At least in a partial segment, between the two conveyor belts there is an additional conveyor belt that removes the packages from the device. On account of the different speeds of the conveyor belts, the packages are first rotated around their vertical axis by an angle of less than 90 degrees by this device as they are being transported. After the packages have left the area of action of the two conveyor belts, the packages are conveyed farther by the middle conveyor belt and then run up against a stop edge, which causes the rotation to be continued. Then the packages arrive in an area where lateral guides are arranged in the shape of a funnel, which cause the desired rotation by 90 degrees to be completed.

Some of the disadvantages of this device are that the packages to be rotated may not be end-to-end and must therefore be separated in advance, and that the impact of the packages against the stop causes an undefined rotation which is essentially left to chance.

The device described by DE 42 14 321 C2 is also suitable only for small production runs.

A similar device is also described in DE 40 36 627. On a device of this type, the packages to be rotated are moved by a conveyor belt with at least two tracks, whereby one track of the conveyor is interrupted by a gap. Inside this gap there is a flat disc or a disk in the shape of a truncated cone that is driven so that it rotates.

The conveyor belts are arranged so that the packages are moved with one of their lower, forward corners onto the disc, whereby first this front corner is accelerated toward the center of the conveyor belt.

As the rotation continues, the bottom longitudinal edge of the package is engaged by the disk and rolls over said disk over almost its entire length. Because the peripheral velocity of the disc is higher at the breakaway points than the belt speed of the conveyor belt, the rotational movement that has been started is continued.

As a result of the arrangement of the lateral guides and/or the advantageous control of the speed of the conveyor belt that is adjacent to the disc, the desired 90 degree rotation is completed.

On this device, too, it is necessary for the packages to be rotated not to arrive at the device end to end, but with spaces in between. The rotation is also essentially undefined, so that it is doubtful that it could be used for higher-speed production. Finally, DE 30 43 469 C2 describes an additional device for the 90 degree rotation of packages. On this device, the rotation is effected by deflector parts located on a vertical axis of rotation.

These deflector parts first pause in a position in which they are capable of receiving a package as it is delivered to them. When this package strikes the deflector parts, a rotational movement by 90 degrees is initiated. The lateral surfaces or edges of the package that are facing away from the deflector parts thereby arrive in the area of action of a driven friction conveyor belt, which by guiding and transporting the lateral surfaces or edges acts on the package so that its rotational movement is effectively assisted.

When the rotation of a package has been completed, the deflector parts once again pause in their receiving position until another package has entered the device.

Of course, the rotation in this device is essentially controlled and defined, although the need for the spaces between the individual packages and the discontinuous operation do not promote high rates or speeds of production.

Object or Objects

The object is to improve devices for the rotation of packages by 90 degrees so that the rotation process can be carried out faster and with more effective control.

SUMMARY

The present application teaches a rotation machine or station for the rotation by an angle of preferably 90 degrees around their vertical axis of packages having a cross section with 2 or n corners and an essentially flat base surface which are moved by a transport conveyor, characterized in that said rotation machine or station consists at least of a main wheel that is driven in rotation and at least one rotation element that is located on said main wheel.

The present application further teaches a method for the rotation by an angle of preferably 90 degrees around their vertical axis of packages having a cross section with 2 or n corners and an essentially flat base surface which are moved by a transport conveyor, characterized in that the packages are delivered to the rotation device without gaps and are rotated around their vertical axis, preferably by an angle of 90 degrees, without prior separation.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in greater detail below with reference to one exemplary embodiment which is illustrated in the accompanying drawings. In the figures:

FIG. 1 is a simplified three-dimensional overview of a rotation machine or station as claimed by the present application;

Developments, advantages and potential applications of the present application are described in detail below with reference to the exemplary embodiments and the accompanying drawings. All the features described and/or illustrated, individually or in any possible combination, are the object of the present application, regardless of their placement in the claims or the references between claims. The content of the claims is also incorporated by reference into the text of the description.

DESCRIPTION OF EMBODIMENT OR EMBODIMENTS

Figure 1A:
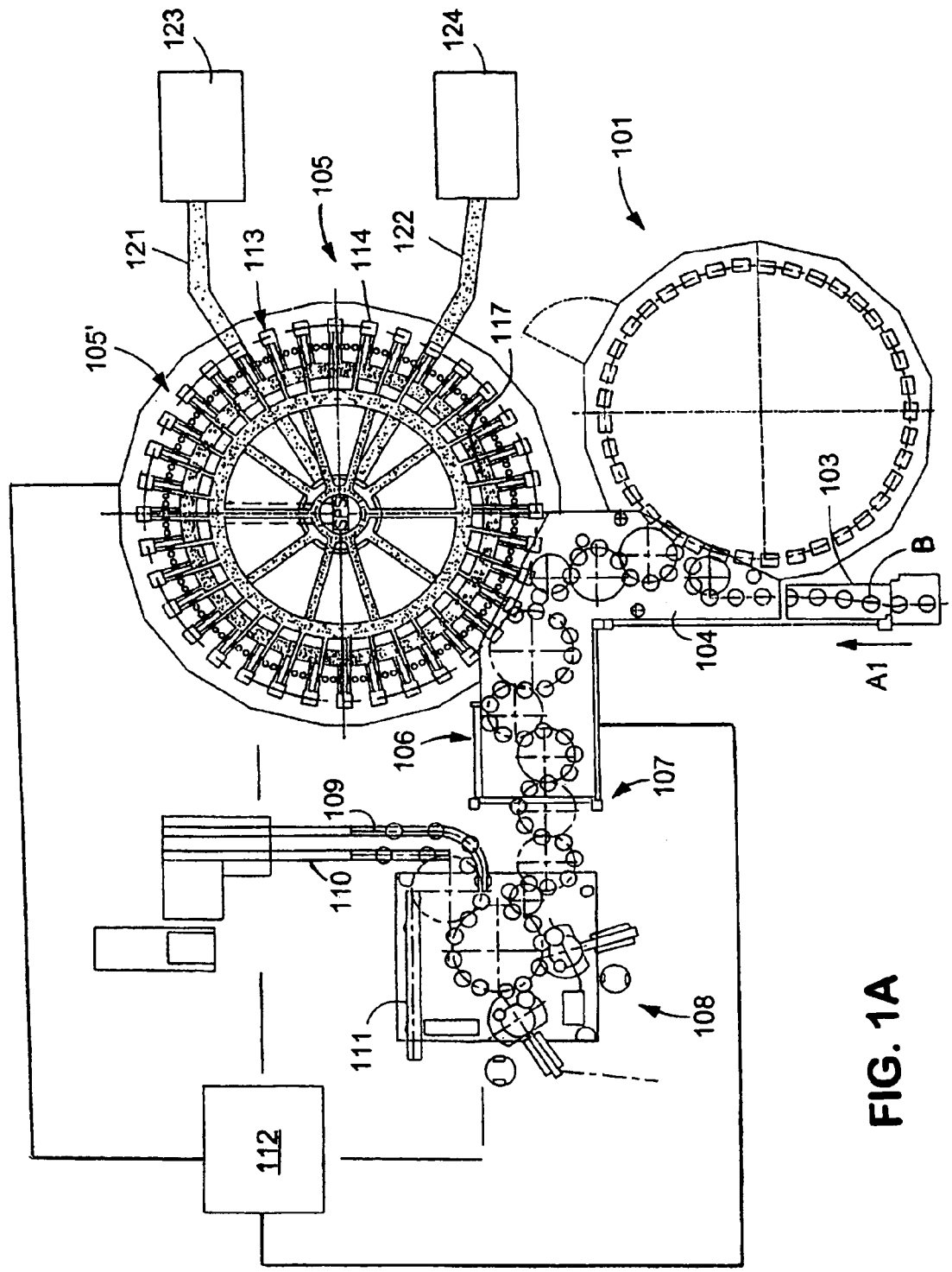
FIG. 1A is a schematic illustration of a container filling plant in accordance with one possible embodiment.

FIG. 1A shows schematically the main components of one possible embodiment example of a system for filling containers, specifically, a beverage bottling plant for filling bottles B with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles B, are fed in the direction of travel as indicated by the arrow A1, by a first conveyer arrangement 103, which can be a linear conveyor or a combination of a linear conveyor and a starwheel. Downstream of the rinsing arrangement or rinsing station 101, in the direction of travel as indicated by the arrow A1, the rinsed bottles B are transported to a beverage filling machine 105 by a second conveyer arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Downstream of the beverage filling machine 105, in the direction of travel of the bottles B, there can be a beverage bottle closing arrangement or closing station 106 which closes or caps the bottles B. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 has three output conveyer arrangement: a first output conveyer arrangement 109, a second output conveyer arrangement 110, and a third output conveyer arrangement 111, all of which convey filled, closed, and labeled bottles B to different locations.

The first output conveyer arrangement 109, in the embodiment shown, is designed to convey bottles B that are filled with a first type of liquid beverage supplied by, for example, the supply reservoir 123. The second output conveyer arrangement 110, in the embodiment shown, is designed to convey bottles B that are filled with a second type of liquid beverage supplied by, for example, the supply reservoir 124. The third output conveyer arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyer arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The scope of the present application extends not only to the rotation of the four-corner packages currently being handled, but also includes the rotation of packages with 2, 3 or n corners.

As illustrated in FIG. 1, the rotation device 16 claimed by the present application is located above a conveyor, such as a conveyor belt 17 for example, whereby it is not necessary for the conveyor belt to extend over the full depth of the rotation device 16.

The rotation device 16 comprises a main wheel 13 which is located at some distance from the plane of the conveyor belt and can be driven in rotation around its main axis M by a drive device (not shown).

Located on this main wheel 13 are a plurality of rotation elements 14 which, starting from the main wheel 13, extend essentially vertically downward toward the plane of the conveyor belt 17.

An inner guide 18 and an outer guide 19 are provided to guide the packages during and after their rotation.

Figure 2:
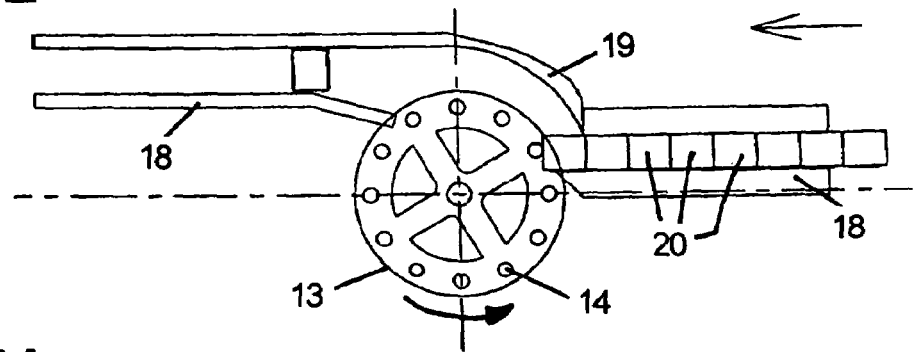
FIGS. 2-2C show, in plan views, the individual steps in the process of rotating packages.
Figure 2A:
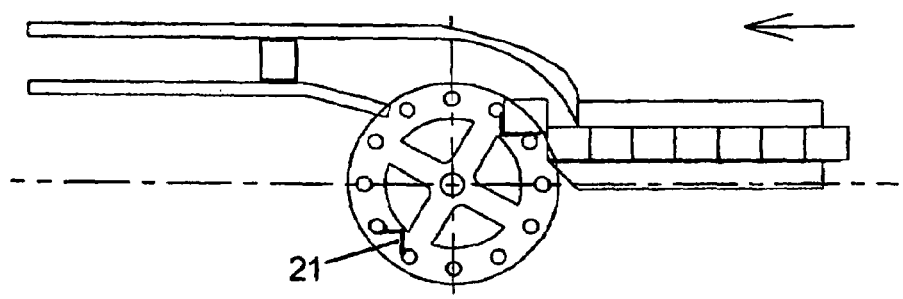
Figure 2B:
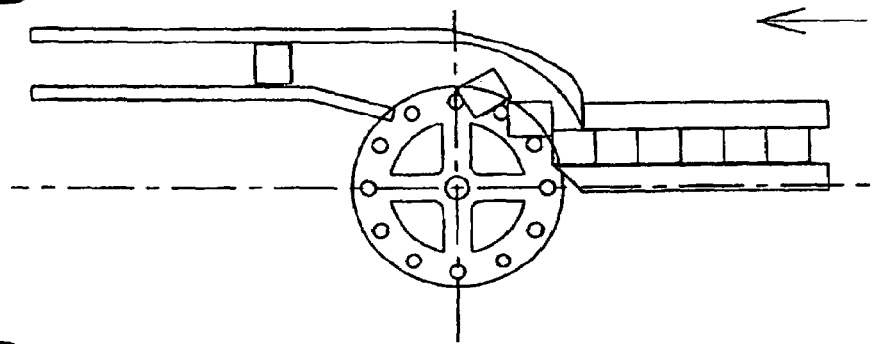
Figure 2C:
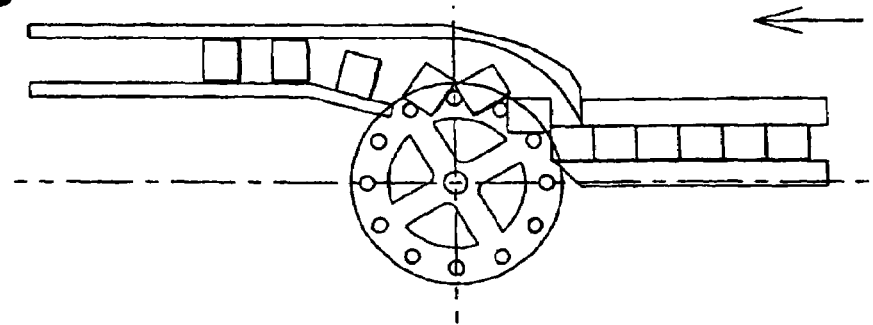

The function of the rotation device 16 is illustrated in FIGS. 2-2C.

The packages 20 are delivered to the rotation device 16 by the conveyor belt 17. The packages 20 can thereby be arranged end-to-end. During the forward movement, each of the packages 20 comes into contact with its front side against one of the rotation elements 14, as a result of which said forward movement is reduced, but not reduced to the value of zero. Because the packages 20 always have a speed that is greater than zero, the rotation device 16 claimed by the present application is suitable in particular for high-speed and high-volume packing lines.

As the main wheel 13 continues to rotate, the package 20 that is in contact with the rotation element 14 is moved farther in the direction of transport. When a specified angle of rotation of the main wheel 13 is reached, the side of the package 20 that is in contact against the inner guide 18 is engaged by the next rotation element 14.

The dimensions of the main wheel 13, rotation elements 14 and guides 18, 19 are advantageously selected so that the package is engaged by the next rotation element 14 in its middle or in the area between the middle and the back side, because in this manner the rotation is optimally assisted.

As a result of the continued rotation of the main wheel 13, the package 20 is first separated from the row of the following packages 20, and as it continues to move is rotated by a specified angle around its vertical axis. In this case, it is of particular advantage that the packages 20 are securely guided by the rotation elements 14.

During the rotational movement of the main wheel 13, the rotation elements 14 describe, among other things, a semicircle at a right angle to the direction of transport. When an individual package 20 has passed the apex of this semicircle, the guidance action of the rotation element 14 ceases on account of the geometric conditions. Beyond a specified angle of rotation of the main wheel 13 with reference to the individual package 20, this influence is so small that the package is carried along by the continuously driven conveyor belt 17 and is therefore completely separated from the main wheel 13.

After a short distance, the package 20 strikes the inner guide 18, where it is oriented and guided so that the desired 90 degree rotation is completed.

Because the inner guide 18 must decelerate the side of the package 20 that is in contact with it relative to the opposite side of the package 20, it is particularly advantageous to equip the relevant segment of the inner guide 18 so that it has a coefficient of friction that is higher than that of the outer guide 19.

In an additional configuration, at least the relevant segment of the outer guide 19 is realized so that it accelerates the side of the package 20 that is in contact with it, for which purpose, for example, the use of guides comprising a driven conveyor belt is provided.

The present application also teaches that the relevant segments of the inner and outer guides 18, 19 are realized in the form of driven conveyor belts, whereby these belts can be operated at the same or different speeds.

In the illustrated exemplary embodiment, the rotation elements 14 have a circular cross section. In another configuration, this circular cross section is replaced by a shape that is more closely adapted to the external contour of the packages 20. For example, the present application teaches that the rotation elements 14 are realized in the form of elements with large surfaces, which can come into effective contact over large areas with the side surfaces of the packages 20. The present application also teaches that the rotation elements 14 are provided with a guide element 21 (FIG. 2A), which is adapted to the shape of the forward edge of the package 20 and thus additionally promotes its secure rotation.

Because the guide element 21 which is illustrated by way of example forms a stop surface that prevents packages 20 or package edges from entering the rotation device so deeply that they cannot later be reliably removed from the rotation device, such a configuration is particularly suitable for the rotation of packages that have 2 or 3 corners.

In a further configuration, the rotation elements 14 are realized so that they can be rotated around their vertical axes, as a result of which the secure rotation of the packages 20 is also assisted. For example, in this respect the present application teaches that the rotation elements 14 are rotated in a controlled manner during the revolution of the main wheel 13 by a non-revolving cam disc.

Alternatively, the present application teaches that the rotation movement of the rotation elements 14 can be effected by servomotors, whereby the angle of rotation of each rotation element 14 is a function of its current angular position in the 360 degree revolution of the main wheel 13.

To make it possible to easily adjust the device described above to different package dimensions, in another configuration the present application teaches that the rotation elements 14 are realized so that they are held in the main wheel 13 so that they can be adjusted radially and or in the shape of a circular arc relative to the vertical axis of the main wheel 13.

The present application also teaches that the rotation elements 14 which are held in the main wheel 13 as described above are interchangeable.

The drive motor of the drive device (not shown) of the main wheel 13 is preferably a servomotor or synchronous motor. In the context of the present application, these terms are used to identify any type of drive motor that can be operated in a regulated manner, whereby parameters such as the angle of rotation, direction of rotation, angular velocity and torque of the motor, for example, can be specified individually or in any desired combination by a control device, such as a control computer, for example, and the actual values achieved are measured by sensors, compared in a suitable computer device with the set points, and any differences are corrected by automatic countermeasures.

The use of a servomotor of this type makes it possible, for example, to operate the main wheel 13 not only continuously but also in stepped operation, so that the motor is in operation only when there are packages to be rotated.

Figure 3:
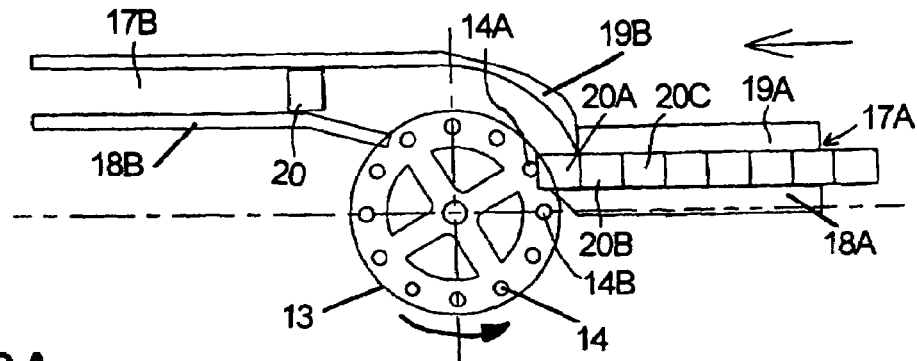
FIGS. 3-3C show, in plan views, the individual steps in the process of rotating packages according to one possible embodiment.
Figure 3A:
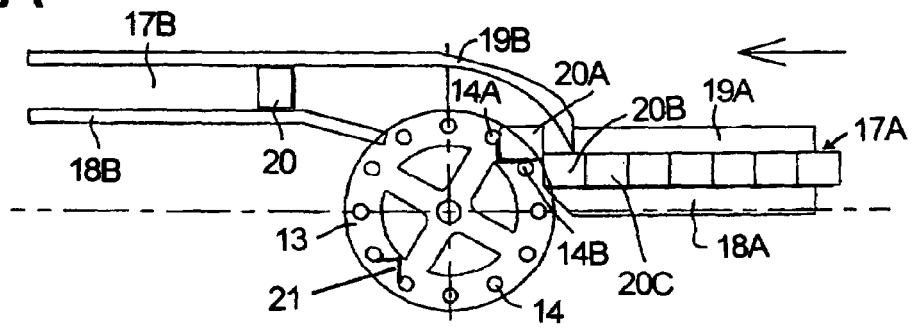

FIGS. 3-3A shows, in plan views, the individual steps in the process of rotating packages 20 according to one possible embodiment. FIG. 3 shows a line of packages 20A, 20B, 20C, etc., lined end-to-end, on a conveyor. The conveyor is one continuous conveyor, and comprises an inboard side 17A and an outboard side 17B. The inboard side 17A carries the packages 20 toward the rotation device 16 and through the area of the main wheel 13, and the outboard side 17B carries the packages 20 away from the rotation device 16 after the packages 20 have been rotated by 90 degrees.

The inboard side of the conveyor 17A comprises an inboard side inner guide 18A and an inboard side outer guide 19A, which guides are configured to guide packages 20 in a line toward the rotation device 16. FIG. 3 shows a package 20A coming into contact with a rotation element 14A. As the main wheel 13 rotates, the side of the package 20A that is in contact with the inboard side inner guide 18A comes into contact with the next rotation element 14B. The package 20A is now in a secure position to be carried by the conveyor and to be rotated 90 degrees by the rotating movement of the rotation device 16. In other words, the package 20A remains in a stationary position between the rotation elements 14A and 14B, while the main wheel 13 rotates. FIG. 3A shows the package 20A resting securely between the rotation elements 14A and 14B, while another package, 20B, is moved by the conveyor 17A towards the rotation device 16.

Figure 3B:
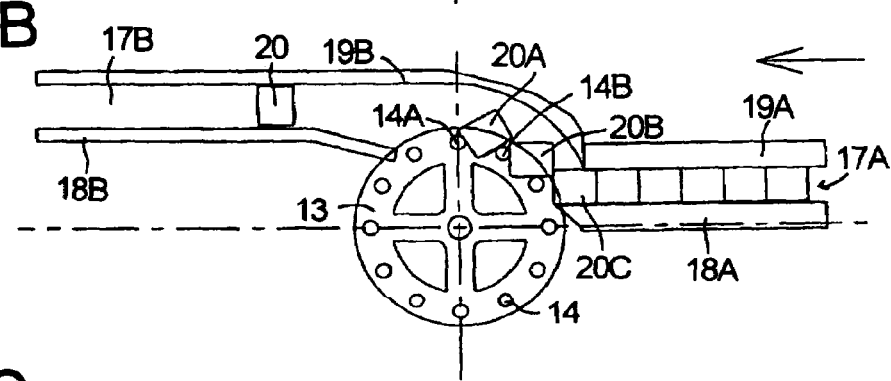

FIG. 3B shows the movement of the packages 20A and 20B towards the outboard side of the conveyor 17B. The outboard side of the conveyor 17B comprises an outboard side inner guide 18B and an outboard side outer guide 19B. The outboard side inner guide 18B is configured and disposed to receive packages 20 and guide them away from the rotation device 16. The outboard side outer guide 19B comprises a curved portion to guide packages in a curved path as packages 20 are rotated by the rotation device 16, and a straight portion to guide packages in a line once they have been rotated by 90 degrees.

Figure 3C:
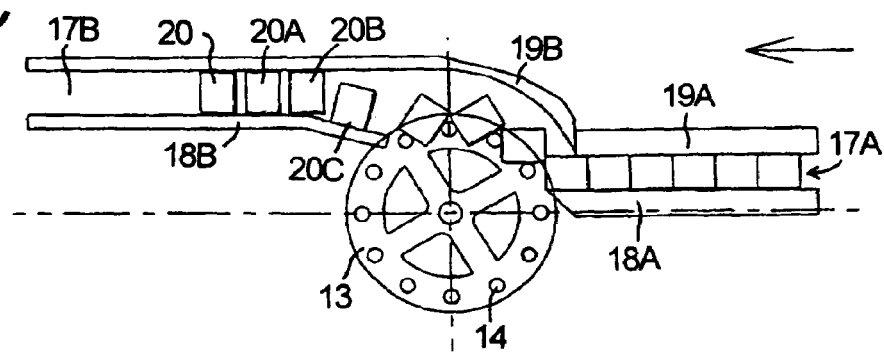

FIG. 3C shows the packages 20A, 20B, 20C, etc., once they have been rotated by 90 degrees by the rotation device 16. Once the packages 20 come into contact with the outboard side inner guide 18B, the packages 20 continue on the outboard side of the conveyor 17B and are guided by the outboard side outer guide 19B and the outboard side inner guide 18B in a line, away from the rotation device 16.

Figure 4:
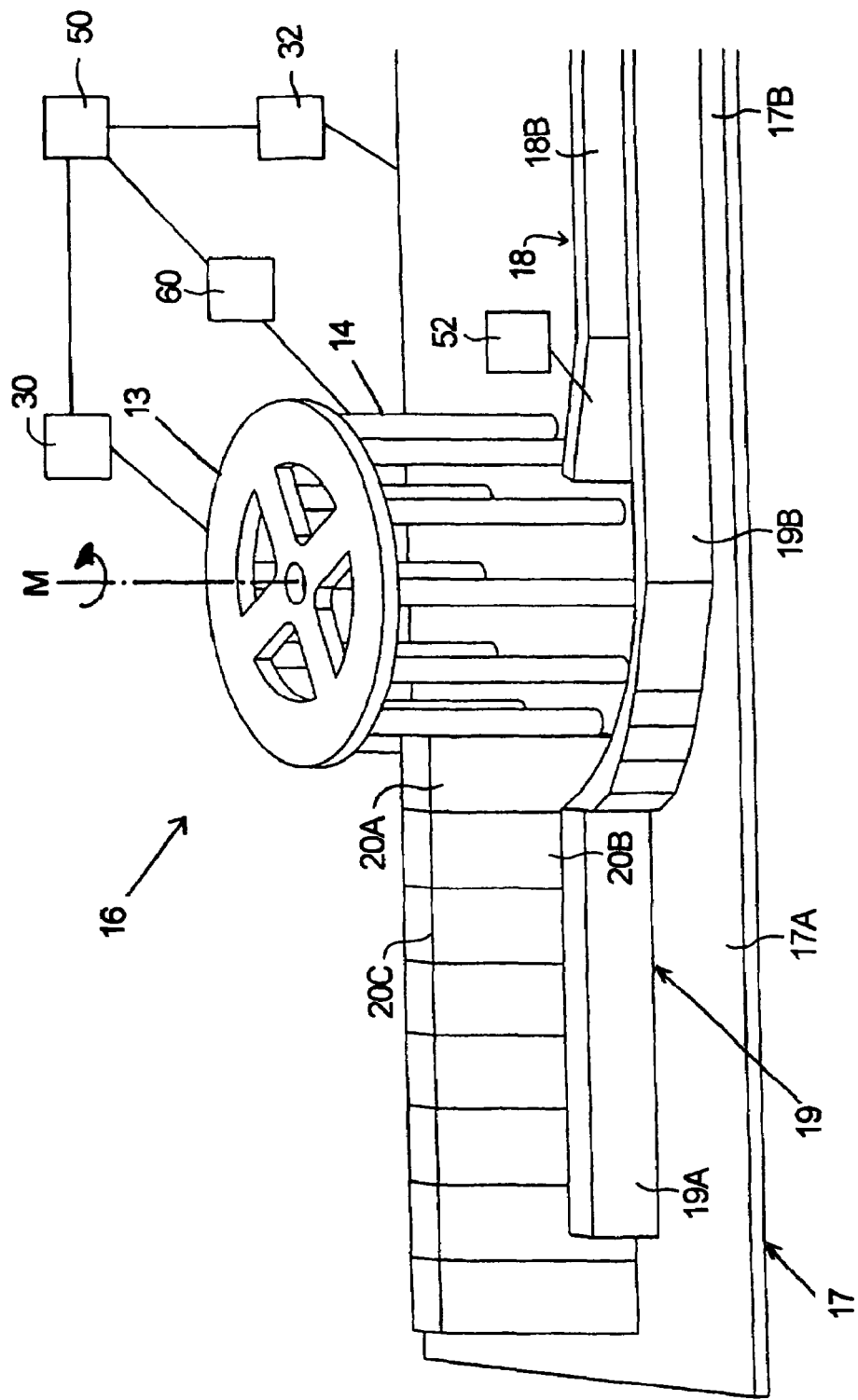
FIG. 4 is similar to FIG. 1, and shows further details according to one possible embodiment.

FIG. 4 is similar to FIG. 1, and shows further details according to one possible embodiment. According to FIG. 4, the conveyor 17 is controlled with a motor 32 and the rotation device 16 is controlled with a motor 30. FIG. 4 also shows a cam system 60 being configured to drive the controlled rotation of the rotation elements 14, according to one possible embodiment. The cam system 60 could also be a servomotor and control system configured to drive the controlled rotation of the rotation elements 14 in another possible embodiment. A computer control system 50 is configured to control the conveyor motor 32 and the rotation device motor 50, in order to control the speeds of the conveyor 17 and the and the main wheel 13. The speeds of the conveyor 17 and the main wheel 13 are coordinated in order to effectively change the orientation of boxes by rotating them 90 degrees. The proper coordination of the conveyor 17 and the main wheel 13 may be determined by experimentation. Further, the characteristics of the packages, such as size, shape, amount of surface friction, number of corners, and weight, may be contributing factors to the size and shape of the rotation elements 14, as well as to the coordination of the speeds of the conveyor 17 and the main wheel 13. The rotation device 16 can be correctly shaped and proportioned to fit essentially any number of packages with any number of sizes, shapes, amounts of surface friction, number of corners, and weights. FIG. 4 further shows a driven element 52 for the inner guide 18, according to another possible embodiment. It should be noted that the outer guide 19 could also comprise a driven element in another possible embodiment.

Figure 5:
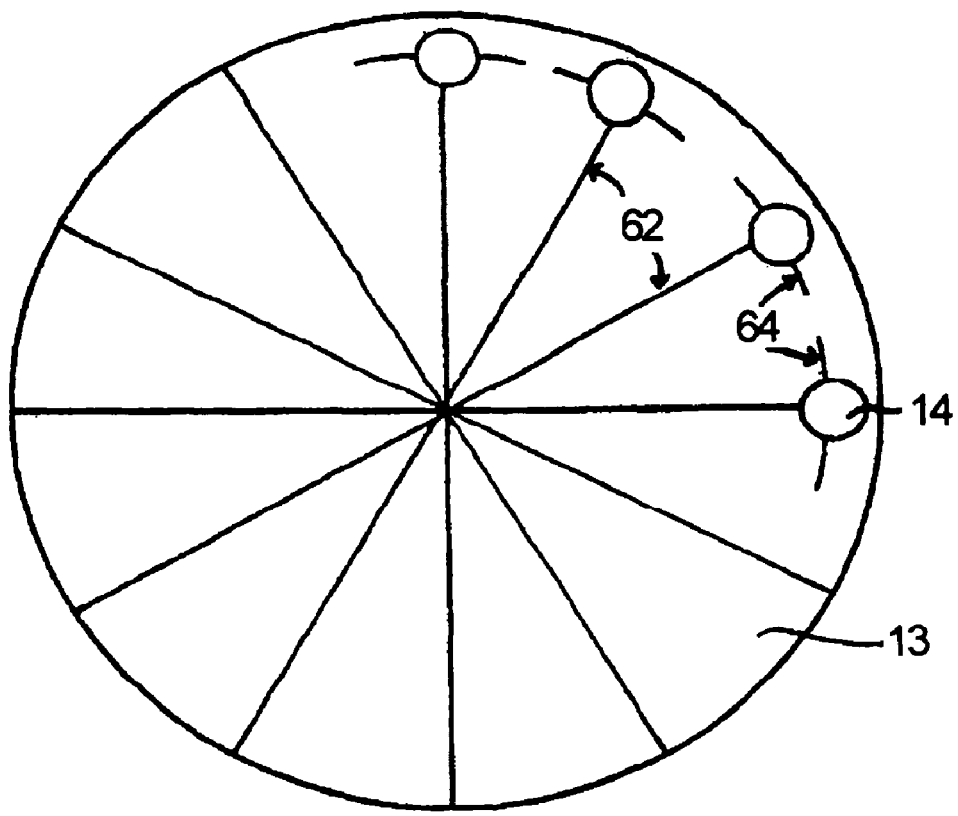
FIG. 5 shows a main wheel with radially and semi-circularly adjustable rotation elements according to another possible embodiment.

FIG. 5 shows another possible embodiment of the main wheel 13. According to the embodiment shown in FIG. 5, the rotation elements 14 can be adjusted radially along the radial adjustments 62. Further, the rotation elements 14 can be adjusted semi-circularly, with regard to the center of the main wheel 13, along the semi-circular adjustments 64. The rotation elements 14 can be adjusted according to the different size, shape, and amount of sides of packages moving through the rotation device. It should be noted that FIG. 5 is included for illustrative purposes, and only a section or portion of the wheel has been fully illustrated.

Figure 6:
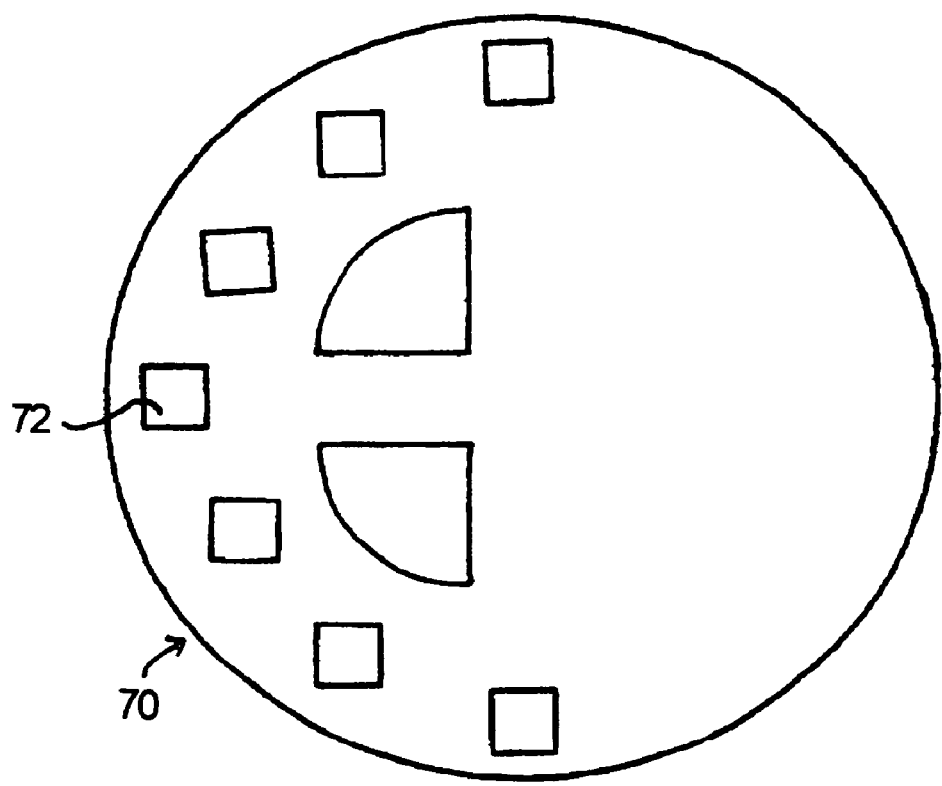
FIG. 6 shows another possible embodiment of the main wheel.

FIG. 6 shows another possible embodiment of the main wheel. According to FIG. 6, the wheel 70 comprises rotation elements 72, which rotation elements 72 are square-shaped. The flat sides of the rotation elements 72 are adapted to fit the flat sides of packages as they move through the rotation device. It should be noted that the rotation elements 72 could be wider or narrower, or longer or shorter, depending upon the sizes, shapes, amounts of surface friction, and number of corners of the packages moving through the rotation device. It should also be noted that FIG. 6 is included for illustrative purposes, and only a section or portion of the wheel has been fully illustrated.

The present application relates to a rotation machine or station for the rotation by an angle of preferably 90 degrees around their vertical axis of packages having a cross section with 2 or n corners and an essentially flat base surface which are moved by a transport conveyor, whereby the rotation machine or station comprises at least a main wheel that is driven in rotation and at least one rotation element that is located on said main wheel.

One feature or aspect of an embodiment is believed at the time of the filing of this patent application to possibly reside broadly in a rotation machine or station for the rotation by an angle of preferably 90 degrees around their vertical axis of packages having a cross section with 2 or n corners and an essentially flat base surface which are moved by a transport conveyor, characterized in that said rotation machine or station consists at least of a main wheel that is driven in rotation and at least one rotation element that is located on said main wheel.

Another feature or aspect of an embodiment is believed at the time of the filing of this patent application to possibly reside broadly in a rotation station, characterized in that the main wheel is located above the transport conveyor.

Yet another feature or aspect of an embodiment is believed at the time of the filing of this patent application to possibly reside broadly in a rotation station, characterized in that the rotation elements, starting from the main wheel, extend essentially vertically downward.

Still another feature or aspect of an embodiment is believed at the time of the filing of this patent application to possibly reside broadly in a rotation station, characterized in that the rotation elements have a cross section which is adapted to the external contour of the packages.

A further feature or aspect of an embodiment is believed at the time of the filing of this patent application to possibly reside broadly in a rotation station, characterized in that the rotation elements can be rotated in a controlled manner around their vertical axis.

Another feature or aspect of an embodiment is believed at the time of the filing of this patent application to possibly reside broadly in a rotation station, characterized in that the control of the rotational movement of the rotation elements around their vertical axis is exerted by means of a cam control system.

Yet another feature or aspect of an embodiment is believed at the time of the filing of this patent application to possibly reside broadly in a rotation station, characterized in that the control of the rotational movement of the rotation elements around their vertical axis is exerted by means of servomotors and control computers.

Still another feature or aspect of an embodiment is believed at the time of the filing of this patent application to possibly reside broadly in a rotation station, characterized in that the rotation elements can be adjusted radially and/or in the shape of a circular arc relative to the main axis of the main wheel.

A further feature or aspect of an embodiment is believed at the time of the filing of this patent application to possibly reside broadly in a rotation station, characterized in that the rotation elements are interchangeable.

Another feature or aspect of an embodiment is believed at the time of the filing of this patent application to possibly reside broadly in a rotation station, characterized in that the lateral guides have different coefficients of friction.

Yet another feature or aspect of an embodiment is believed at the time of the filing of this patent application to possibly reside broadly in a rotation station, characterized in that at least one lateral guide consists of a driven element.

Still another feature or aspect of an embodiment is believed at the time of the filing of this patent application to possibly reside broadly in a rotation station, characterized in that at least one guide element is fastened to the rotation elements.

A further feature or aspect of an embodiment is believed at the time of the filing of this patent application to possibly reside broadly in a method for the rotation by an angle of preferably 90 degrees around their vertical axis of packages having a cross section with 2 or n corners and an essentially flat base surface which are moved by a transport conveyor, characterized in that the packages are delivered to the rotation device without gaps and are rotated around their vertical axis, preferably by an angle of 90 degrees, without prior separation.

Another feature or aspect of an embodiment is believed at the time of the filing of this patent application to possibly reside broadly in a method for the rotation of packages, characterized in that the packages always have a speed that is greater than zero inside the rotation station.

Yet another feature or aspect of an embodiment is believed at the time of the filing of this patent application to possibly reside broadly in a method for the rotation of packages, characterized in that the rotation elements are engaged with the surfaces and/or edges of the packages.

Still another feature or aspect of an embodiment is believed at the time of the filing of this patent application to possibly reside broadly in a method for the rotation of packages, characterized in that the rotation station is operated continuously and/or discontinuously.

Some examples of position sensors or position sensor systems that may be used or adapted for use in at least one possible embodiment of the present invention may be found in the following U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

The components disclosed in the various publications, disclosed or incorporated by reference herein, may possibly be used in possible embodiments of the present invention, as well as equivalents thereof.

Some examples of wrapping machines which may possibly be utilized or adapted for use in at least one possible embodiment may possibly be found in the following U.S. Pat. No. 6,484,475, entitled "Modular packaging machine;" U.S. Pat. No. 4,694,633, entitled "Film wrapping machine;" U.S. Pat. No. 4,118,916, entitled "Thermoplastic wrapping machine;" U.S. Pat. No. 4,118,916, entitled "Thermoplastic wrapping machine;" U.S. Pat. No. 5,371,999, entitled "Shrink film wrapping machine;" U.S. Pat. No. 4,748,795, entitled "Film wrapping machine;" and U.S. Pat. No. 5,115,620, entitled "Wrapping machine."

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The Innopack packaging machine, manufactured by KHS Maschinen und Anlagenbau AG, is an example of a packaging machine which may possibly be utilized or adapted for use in at least one possible embodiment. Some other examples of packaging machines which may possibly be utilized or adapted for use in at least one possible embodiment may possibly be found in the following U.S. Pat. No. 4,964,260, entitled "Packaging machine for cardboard boxes and process for packaging articles in cardboard boxes;" U.S. Pat. No. 4,785,610, entitled "Automatic machine for packaging products of different kinds in boxes;" U.S. Pat. No. 5,265,398, entitled "Automatic counting and boxing machine;" U.S. Pat. No. 5,943,847, entitled "Packaging machine for multi-packs;" U.S. Pat. No. 5,937,620, entitled "Packaging machine for multi-packs;" U.S. Pat. No. 5,711,137, entitled "Packaging machine and method of packaging articles;" and U.S. Pat. No. 5,706,633, entitled "Packaging machine and method of packaging articles."

The appended drawings in their entirety, including all dimensions, proportions and/or shapes in at least one embodiment of the invention, are accurate and are hereby included by reference into this specification.

Some examples of computer systems that may possibly be utilized or possibly adapted for use in at least one possible embodiment of the present application may possibly be found in the following U.S. Pat. No. 5,416,480 issued to Roach et al. on May 16, 1995; U.S. Pat. No. 5,479,355 issued to Hyduke on Dec. 26, 1995; U.S. Pat. No. 5,481,730 issued to Brown et al. on Jan. 2, 1996; U.S. Pat. No. 5,805,094 issued to Roach et al. on Sep. 8, 1998; U.S. Pat. No. 5,881,227 issued to Atkinson et al. on Mar. 9, 1999; and U.S. Pat. No. 6,072,462 issued to Moshovich on Jun. 6, 2000.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of low friction coatings which may possibly be utilized or adapted for use in at least one possible embodiment may possibly be found in the following U.S. Pat. No. 6,551,718, entitled "Low friction coating;" U.S. Pat. No. 6,284,322, entitled "Low-friction coating composition;" U.S. Pat. No. 6,084,034, entitled "Functional coating for reducing friction;" U.S. Pat. No. 5,763,011, "Functional coating for reducing friction;" U.S. Pat. No. 5,674,951, entitled "Abrasion-resistant and low friction coating compositions;" U.S. Pat. No. 5,482,637, entitled "Anti-friction coating composition containing solid lubricants;" and U.S. Pat. No. 4,849,264, entitled "Friction reducing coating for metal surfaces."

All, or substantially all, of the components and methods of the various embodiments may be used with at least one embodiment or all of the embodiments, if more than one embodiment is described herein.

Some examples of synchronous motors which may possibly be utilized or adapted for use in at least one possible embodiment may possibly be found in the following U.S. Pat. No. 6,713,899, entitled "Linear synchronous motor;" U.S. Pat. No. 6,486,581, entitled "Interior permanent magnet synchronous motor;" U.S. Pat. No. 6,424,114, entitled "Synchronous motor;" U.S. Pat. No. 6,388,353, entitled "Elongated permanent magnet synchronous motor;" U.S. Pat. No. 6,329,728, entitled "Cylinder-type linear synchronous motor;" U.S. Pat. No. 6,025,659, entitled "Synchronous motor with movable part having permanent magnets;" U.S. Pat. No. 5,936,322, entitled "Permanent magnet type synchronous motor;" and U.S. Pat. No. 5,448,123, entitled "Electric synchronous motor."

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

Some examples of shrink wrapping machines or machines for wrapping items in plastic film which may possibly be utilized or adapted for use in at least one possible embodiment may possibly be found in the following U.S. Pat. No. 6,826,893, entitled "Apparatus for wrapping products with plastic film;" U.S. Pat. No. 6,739,115, entitled "Equipment for wrapping groups of products in plastic film;" U.S. Pat. No. 5,878,555, entitled "Apparatus for wrapping articles in plastic film;" U.S. Pat. No. 5,787,691, entitled "Apparatus for wrapping articles in plastic film;" U.S. Pat. No. 5,519,983, entitled "Shrink wrap packaging system with an ultrasonic side sealer;" U.S. Pat. No. 4,956,963, entitled "Method of sealing a shrink wrap package;" U.S. Pat. No. 4,873,814, entitled "Method of making a shrink wrap package;" and U.S. Pat. No. 4,214,419, entitled "Collating and shrink wrap packaging apparatus."

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of servo-motors that may possibly be utilized or possibly adapted for use in at least one possible embodiment of the present application may possibly be found in the following U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025 issued to Yasui on Feb. 15, 2000.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

The corresponding foreign applications, namely, Federal Republic of Germany Patent Application No. 10 2004 052 784.9, filed on Oct. 30, 2004, having inventors Stefan Wagner, Hans-Gerd Ripkens, Stefan Willemsen, and Frank Nebel, and DE-OS 10 2004 052 784.9 and DE-PS 10 2004 052 784.9, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Some examples of rotation sensors that may possibly be utilized or possibly adapted for use in at least one possible embodiment of the present application may possibly be found in the following U.S. Pat. No. 6,246,232 issued to Okamura on Jun. 12, 2001; U.S. Pat. No. 6,448,761 issued to Stumpe on Sep. 10, 2002; U.S. Pat. No. 6,474,162 to Voss et al. on Nov. 5, 2002; U.S. Pat. No. 6,498,481 issued to Apel on Dec. 24, 2002; U.S. Pat. No. 6,532,831 issued to Jin et al. on Mar. 18, 2003; and U.S. Pat. No. 6,672,175 issued to Jin et al. on Jan. 6, 2004.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of bottling and container handling systems and components thereof which may possibly be utilized or adapted for use in at least one possible embodiment, may possibly be found in the following U.S. Pat. No. 6,484,477, entitled "Capping Machine for Capping and Closing Containers, and a Method for Closing Containers;" U.S. Pat. No. 6,474,368, entitled "Beverage Container Filling Machine, and Method for Filling Containers with a Liquid Filling Material in a Beverage Container Filling Machine;" U.S. Pat. No. 6,494,238, entitled "A Plant for Filling Beverage into Beverage Bottles Other Beverage Containers Having Apparatus for Replacing Remaining Air Volume in Filled Beverage Bottles or Other Beverage Containers;" U.S. Pat. No. 6,470,922, entitled "Apparatus for the Recovery of an Inert Gas;" U.S. Pat. No. 6,463,964, entitled "Method of Operating a Plant for Filling Bottles, Cans or the like Beverage Containers with a Beverage, and a Beverage Container Filling Machine;" U.S. Pat. No. 6,834,473, entitled "Bottling Plant and Method of Operating a Bottling Plant and a Bottling Plant with Sections for Stabilizing the Bottled Product;" U.S. Pat. No. 6,484,762, entitled "A Filling System with Post-dripping Prevention;" and U.S. Pat. No. 6,668,877, entitled "Filling System for Still Beverages."

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

Some examples of bottling and container handling systems and components thereof which may possibly be utilized or adapted for use in at least one possible embodiment, may possibly be found in the following U.S. patent application Ser. No. 10/653,617, filed on Sep. 2, 2003, having Attorney Docket No. NHL-HOL-60, entitled "Labeling Machine with a Sleeve Mechanism for Preparing and Applying Cylindrical Labels onto Beverage Bottles and Other Beverage Containers in a Beverage Container Filling Plant;" Ser. No. 10/666,931, filed on Sep. 18, 2003, entitled "Beverage Bottling Plant for Filling Bottles with a Liquid Beverage Filling Material and a Labelling Station for Filled Bottles and Other Containers;" Ser. No. 10/723,451, filed on Nov. 26, 2003, entitled "Beverage Bottling Plant for Filling Beverage Bottles or Other Beverage Containers with a Liquid Beverage Filling Material and Arrangement for Dividing and Separating of a Stream of Beverage Bottles or Other Beverage Containers;" Ser. No.

10/739,895, filed on Dec. 18, 2003, entitled "Method of Operating a Beverage Container Filling Plant with a Labeling Machine for Labeling Beverage Containers Such as Bottles and Cans, and a Beverage Container Filling Plant with a Labeling Machine for Labeling Beverage Containers Such as Bottles and Cans;" Ser. No. 10/756,171, filed on Jan. 13, 2004, entitled "A Beverage Bottling Plant for Filling Bottles and like Containers with a Liquid Beverage Filling Material and a Conveyer Arrangement for Aligning and Distributing Packages Containing Filled Bottles and like Containers;" Ser. No. 10/780,280, entitled "A Beverage Bottling Plant for Filling Bottles with a Liquid Beverage Filling Material, a Container Filling Plant Container Information Adding Station, Such As, a Labeling Station, Configured to Add Information to Containers, Such As, Bottles and Cans, and Modules for Labeling Stations;" Ser. No. 10/786,256, entitled "A Beverage Bottling Plant for Filling Bottles with a Liquid Beverage Filling Material, and a Container Filling Lifting Device for Pressing Containers to Container Filling Machines;" Ser. No. 10/793,659, entitled "A Beverage Bottling Plant for Filling Bottles with a Liquid Beverage Filling Material, and a Container Filling Plant Container Information Adding Station, Such As, a Labeling Station Having a Sleeve Label Cutting Arrangement, Configured to Add Information to Containers, Such As, Bottles and Cans;" Ser. No. 10/801,924, filed on Mar. 16, 2004, entitled "Beverage Bottling Plant for Filling Bottles with a Liquid Beverage Filling Material, and a Cleaning Device for Cleaning Bottles in a Beverage Bottling Plant;" Ser. No. 10/813,651, filed on Mar. 30, 2004, entitled "A Beverage Bottling Plant for Filling Bottles with a Liquid Beverage Filling Material, and an Easily Cleaned Lifting Device in a Beverage Bottling Plant;" Ser. No. 10/814,624, filed on Mar. 31, 2004, entitled "A Beverage Bottling Plant for Filling Bottles with a Liquid Beverage Filling Material, and a Container Filling Plant Container Information Adding Station, Such As, a Labeling Station Having a Gripper Arrangement, Configured to Add Information to Containers, Such As, Bottles and Cans;" Ser. No. 10/816,787, filed on Apr. 2, 2004, entitled "A Beverage Bottling Plant for Filling Bottles with a Liquid Beverage Filling Material, and Apparatus for Attaching Carrying Grips to Containers with Filled Bottles;" Ser. No. 10/865,240, filed on Jun. 10, 2004, Entitled "A Beverage Bottling Plant for Filling Bottles with a Liquid Beverage Filling Material, a Beverage Container Filling Machine, and a Beverage Container Closing Machine;" Ser. No. 10/883,591, filed on Jul. 1, 2004, entitled "A Beverage Bottling Plant for Filling Bottles with a Liquid Beverage Filling Material Having a Container Filling Plant Container Information Adding Station, Such As, a Labeling Station, Configured to Add Information to Containers, Such As, Bottles and Cans, and Modules for Labeling Stations and a Bottling Plant Having a Mobile Module Carrier;" Ser. No. 10/930,678, filed on Aug. 31, 2004, entitled "A Beverage Bottling Plant for Filling Bottles with a Liquid Beverage Filling Material, a Container Filling Plant Container Filling Machine, and a Filter Apparatus for Filtering a Liquid Beverage;" Ser. No. 10/931,817, filed on Sep. 1, 2004, entitled "A Beverage Bottling Plant for Filling Bottles with a Liquid Beverage Filling Material, Having an Apparatus for Exchanging Operating Units Disposed at Rotating Container Handling Machines;" Ser. No. 10/939,170, filed on Sep. 10, 2004, Ser. No. 10/954,012, filed on Sep. 29, 2004, Ser. No. 10/952,706, Ser. No. 10/962,183, filed on Oct. 8, 2004, Ser. No. 10/967,016, filed on Oct. 15, 2004, Ser. No. 10/982,706, filed on Nov. 5, 2004, Ser. No. 10/982,694, Ser. No. 10/982,710, Ser. No. 10/984,677, filed on Nov. 9, 2004, Ser. No. 10/985,640, filed on Nov. 10, 2004, Ser. No. 11/004,663, filed on Dec. 3, 2004, Ser. No. 11/009,551, filed on Dec. 10, 2004, Ser. No. 11/012,859, filed on Dec. 15, 2004, Ser. No. 11/014,673, filed on Dec. 16, 2004, Ser. No. 11/016,364, filed on Dec. 17, 2004, and Ser. No. 11/016,363, The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of operating a rotation machine in a packing station to rotate packages by about 90 degrees, said rotation machine comprising:
   a conveyor belt being configured and disposed to move in a direction and to carry packages thereon;
   a wheel structure being configured and disposed to engage and rotate packages on said conveyor belt by about 90 degrees;
   said conveyor belt being configured and disposed to move packages disposed thereon to said wheel structure, in conjunction with said wheel structure, and away from said wheel structure;
   said wheel structure comprising:
      a wheel comprising a peripheral region and a centrally disposed vertical axis about which said peripheral region is configured to rotate horizontally;
      at least a portion of said wheel being disposed above said conveyor belt and at a distance from said conveyor belt;
      a motor being operatively connected to said wheel to drive and rotate said wheel horizontally about its vertical axis;
      a plurality of elongated members being disposed on and spaced apart about said peripheral region of said wheel and being configured and disposed to contact and rotate packages on said conveyor belt by about 90 degrees;
      each of said elongated members being disposed to extend from said wheel vertically and downwardly toward said conveyor belt a sufficient distance to engage packages on said conveyor belt;
      each pair of successive elongated members comprising a first elongated member and a second elongated member being disposed a distance from one another about said peripheral region of said wheel sufficient to accept there between a portion of a package including a corner to permit rotation of the package by about 90 degrees;
      said first elongated member being disposed rotationally ahead of and adjacent said second elongated member;
      said first elongated member being configured to be disposed to contact a first side of a package, and said second elongated member being configured to be disposed to contact a second side of the package;
      said wheel being configured to be disposed in a first rotational position in which solely said first elongated member is in contact with a first side of a package being disposed at a first package position on said conveyor belt;
      said wheel being configured to be disposed in a second rotational position in which said first elongated member is in contact with a first side of a package and said second elongated member is in contact with a second side of the package being disposed at a second package position on said conveyor belt farther from the first package position along the direction of movement of said conveyor belt;

said wheel being configured to be disposed in a third rotational position in which said first and second elongated members are in contact with corresponding first and second sides of a package being disposed at a third package position on said conveyor belt a distance from the second package position along a diagonal direction in which the package has been rotated about its vertical axis about 90 degrees from its orientation in the first package position;

said method comprising the steps of:

moving said conveyor belt and packages disposed thereon in the direction of movement of said conveyor belt toward said wheel structure;

rotating said wheel to position said first elongated member of a pair of elongated members ahead of a first side of a first package in a first package position on said conveyor belt;

introducing a corner portion of said first package between said first and second elongated members of the pair of elongated members with said moving conveyor belt;

continuing rotating said wheel and contacting, with said second elongated member, a second side of said first package in a second package position on said conveyor belt farther from the first package position;

continuing rotating said wheel and moving, with both said second elongated member and said conveyor belt, said first package both transverse to and along the direction of movement of said conveyor belt to a third package position on said conveyor belt farther from the second package position and rotating said first package about its vertical axis about 90 degrees from its orientation in the first position; and releasing said first package from said wheel structure and moving said first package away from said wheel structure with said conveyor belt after said first package has been rotated about 90 degrees.

2. The method according to claim 1, wherein said method further comprises:

moving said packages on said conveyor belt, without any spaces or gaps between said packages, toward and into said wheel; and releasing rotated packages from said wheel with spaces or gaps between said released, rotated packages.

3. The method according to claim 2, wherein:

said rotation machine comprises an output guide;

said output guide is disposed above said conveyor belt adjacent said wheel and to extend away from said wheel substantially in the direction of movement of said conveyor belt;

said output guide is configured and disposed to contact packages being moved out of said wheel to guide the packages and complete the rotation thereof to essentially 90 degrees; and said method further comprises moving packages on said conveyor belt away from said wheel and into said output guide and completing the rotation thereof to essentially 90 degrees.

4. The method according to claim 3, wherein said wheel structure comprises an arrangement configured to rotate said elongated members in a controlled manner around their vertical axes.

5. The method according to claim 4, wherein said elongated members are configured to be adjusted at least one of: radially relative to said vertical axis of said wheel, and along the perimeter of said wheel relative to said vertical axis of said wheel.

6. The method according to claim 5, wherein:

said output guide comprises an inner guide and an outer guide configured and disposed to guide packages on said conveyor belt there between;

said inner guide being disposed adjacent said wheel and being disposed closer to said wheel than said outer guide; and said inner guide is disposed to project into a path of movement of packages in said wheel to contact the packages in said wheel and guide the packages out of said wheel as the packages move on said conveyor belt.

7. The method according to claim 6, wherein:

said inner guide and said outer guide have different coefficients of friction;

said inner guide has a higher coefficient of friction than said outer guide; and at least one of said inner guide and said outer guide comprises a conveyor belt.

8. The method according to claim 7, wherein:

said wheel structure comprises at least one guide element being configured and disposed to be fastened between said first and said second elongated members; and said method further comprises engaging said first package with said guide element.

9. The method according to claim 8, wherein said method further comprises moving packages at a speed that is greater than zero inside said rotation machine.

10. The method according to claim 9, wherein said method comprises operating said rotation machine at least one of: continuously and discontinuously.

11. A packing station to pack articles into packages comprising a rotation machine being configured and disposed to rotate packages by a substantial number of degrees, said rotation machine comprising:

a conveyor belt being configured and disposed to move in a direction and to carry packages thereon;

a wheel structure being configured and disposed to engage and rotate packages on said conveyor belt by about 90 degrees;

said conveyor belt being configured and disposed to move packages disposed thereon to said wheel structure, in conjunction with said wheel structure, and away from said wheel structure; and said wheel structure comprising:

a wheel comprising a peripheral region and a centrally disposed vertical axis about which said peripheral region is configured to rotate horizontally;

at least a portion of said wheel being disposed above said conveyor belt and at a distance from said conveyor belt;

a motor being operatively connected to said wheel to drive and rotate said wheel horizontally about its vertical axis;

a plurality of elongated members being disposed on and spaced apart about said peripheral region of said wheel and being configured and disposed to contact and rotate packages on said conveyor belt by about 90 degrees;

each of said elongated members being disposed to extend from said wheel vertically and downwardly toward said conveyor belt a sufficient distance to engage packages on said conveyor belt;

each pair of successive elongated members comprising a first elongated member and a second elongated member being disposed a distance from one another about said peripheral region of said wheel sufficient to accept there between a portion of a package including a corner to permit rotation of the package by about 90 degrees;

said first elongated member being disposed rotationally ahead of and adjacent said second elongated member;

said first elongated member being configured to be disposed to contact a first side of a package, and said second elongated member being configured to be disposed to contact a second side of the package;

said wheel being configured to be disposed in a first rotational position in which solely said first elongated member is in contact with a first side of a package being disposed at a first package position on said conveyor belt;

said wheel being configured to be disposed in a second rotational position in which said first elongated member is in contact with a first side of a package and said second elongated member is in contact with a second side of the package being disposed at a second package position on said conveyor belt farther from the first package position along the direction of movement of said conveyor belt; and said wheel being configured to be disposed in a third rotational position in which said first and second elongated members are in contact with corresponding first and second sides of a package being disposed at a third package position on said conveyor belt a distance from the second package position along a diagonal direction in which the package has been rotated about its vertical axis about 90 degrees from its orientation in the first package position.

12. The packing station according to claim 11, wherein each of said elongated members has a cross section which is adapted to the external contour of packages.

13. The packing station according to claim 12, further comprising a drive arrangement being operatively connected to said elongated members to rotate said elongated members in a controlled manner around their vertical axes.

14. The packing station according to claim 13, wherein said drive arrangement comprises one of:

a cam control system configured to control the rotational movement of said elongated members around their vertical axes; and servomotors and control computers configured to control the rotational movement of said elongated members around their vertical axes.

15. The packing station according to claim 14, wherein:

said elongated members are configured to be adjusted at least one of: radially relative to said vertical axis of said wheel, and along the perimeter of said wheel relative to said vertical axis of said wheel;

said elongated members are interchangeable;

said rotation machine comprises an output guide;

said output guide is disposed above said conveyor belt adjacent said wheel and to extend away from said wheel substantially in the direction of movement of said conveyor belt;

said output guide is configured and disposed to contact packages being moved out of said wheel to guide the packages and complete the rotation thereof to essentially 90 degrees;

said output guide comprises an inner guide and an outer guide configured and disposed to guide packages on said conveyor belt there between;

said inner guide being disposed adjacent said wheel and being disposed closer to said wheel than said outer guide;

said inner guide is disposed to project into a path of movement of packages in said wheel to contact the packages in said wheel and guide the packages out of said wheel as the packages move on said conveyor belt;

said inner guide and said outer guide have different coefficients of friction;

said inner guide has a higher coefficient of friction than said outer guide;

at least one of said inner guide and said outer guide comprises a conveyor belt; and said wheel structure comprises at least one guide element being configured and disposed to be fastened between said first and said second elongated members.

16. A container filling plant for filling containers with a filling material, said container filling plant comprising:

a filling machine being configured and disposed to fill empty containers with a filling material;

a first transfer arrangement being configured and disposed to move containers to said filling machine;

said filling machine comprising:

a moving device being configured and disposed to accept containers from said first moving arrangement and to move containers within said filling machine;

an apparatus being configured and disposed to hold containers during filling; and at least one filling device being configured and disposed to fill containers with a filling material upon the containers being within said filling machine;

a closing machine being configured and disposed to close filled containers;

a second transfer arrangement being configured and disposed to accept filled containers from said moving device of said filling machine to move filled containers out of said filling machine;

said second transfer arrangement being configured and disposed to move filled containers from said filling machine to said closing machine;

said closing machine comprising:

a moving device being configured and disposed to accept filled containers from said second moving arrangement and to move filled containers within said closing machine;

an apparatus being configured and disposed to hold filled containers during closing; and at least one closing device being configured and disposed to close filled containers upon the filled containers being within said closing machine;

a third transfer arrangement being configured and disposed to accept closed containers from said moving device of said closing machine to move closed containers out of said closing machine;

a container packing device being configured and disposed to pack containers into packs containing a plurality of containers;

a fourth transfer arrangement being configured and disposed to move filled, closed containers into said container packing device; said container packing device comprising:

a first container packing transfer arrangement being configured and disposed to move containers through and out of said container packing device;

a packing arrangement being configured and disposed to receive and pack containers into packages; and a supply of packing material being configured and disposed to have containers packed therein by said packing arrangement;

a rotation machine being configured and disposed to rotate packages by a substantial number of degrees; and
said rotation machine comprising:
   a conveyor belt being configured and disposed to move in a direction and to carry packages thereon;
   a wheel structure being configured and disposed to engage and rotate packages on said conveyor belt by about 90 degrees;
   said conveyor belt being configured and disposed to move packages disposed thereon to said wheel structure, in conjunction with said wheel structure, and away from said wheel structure; and
said wheel structure comprising:
   a wheel comprising a peripheral region and a centrally disposed vertical axis about which said peripheral region is configured to rotate horizontally;
   at least a portion of said wheel being disposed above said conveyor belt and at a distance from said conveyor belt;
   a motor being operatively connected to said wheel to drive and rotate said wheel horizontally about its vertical axis;
   a plurality of elongated members being disposed on and spaced apart about said peripheral region of said wheel and being configured and disposed to contact and rotate packages on said conveyor belt by about 90 degrees;
   each of said elongated members being disposed to extend from said wheel vertically and downwardly toward said conveyor belt a sufficient distance to engage packages on said conveyor belt;
   each pair of successive elongated members comprising a first elongated member and a second elongated member being disposed a distance from one another about said peripheral region of said wheel sufficient to accept there between a portion of a package including a corner to permit rotation of the package by about 90 degrees;
   said first elongated member being disposed rotationally ahead of and adjacent said second elongated member;
   said first elongated member being configured to be disposed to contact a first side of a package, and said second elongated member being configured to be disposed to contact a second side of the package;
   said wheel being configured to be disposed in a first rotational position in which solely said first elongated member is in contact with a first side of a package being disposed at a first package position on said conveyor belt;
   said wheel being configured to be disposed in a second rotational position in which said first elongated member is in contact with a first side of a package and said second elongated member is in contact with a second side of the package being disposed at a second package position on said conveyor belt farther from the first package position along the direction of movement of said conveyor belt; and
   said wheel being configured to be disposed in a third rotational position in which said first and second elongated members are in contact with corresponding first and second sides of a package being disposed at a third package position on said conveyor belt a distance from the second package position along a diagonal direction in which the package has been rotated about its vertical axis about 90 degrees from its orientation in the first package position.

17. The packing station according to claim 16, wherein each of said elongated members has a cross section which is adapted to the external contour of packages.

18. The packing station according to claim 17, further comprising a drive arrangement being operatively connected to said elongated members to rotate said elongated members in a controlled manner around their vertical axes.

19. The packing station according to claim 18, wherein said drive arrangement comprises one of:
   a cam control system configured to control the rotational movement of said elongated members around their vertical axes; and
   servomotors and control computers configured to control the rotational movement of said elongated members around their vertical axes.

20. The packing station according to claim 19, wherein:
   said elongated members are configured to be adjusted at least one of: radially relative to said vertical axis of said wheel, and along the perimeter of said wheel relative to said vertical axis of said wheel;
   said elongated members are interchangeable;
   said rotation machine comprises an output guide;
   said output guide is disposed above said conveyor belt adjacent said wheel and to extend away from said wheel substantially in the direction of movement of said conveyor belt;
   said output guide is configured and disposed to contact packages being moved out of said wheel to guide the packages and complete the rotation thereof to essentially 90 degrees;
   said output guide comprises an inner guide and an outer guide configured and disposed to guide packages on said conveyor belt there between;
   said inner guide being disposed adjacent said wheel and being disposed closer to said wheel than said outer guide;
   said inner guide is disposed to project into a path of movement of packages in said wheel to contact the packages in said wheel and guide the packages out of said wheel as the packages move on said conveyor belt;
   said inner guide and said outer guide have different coefficients of friction;
   said inner guide has a higher coefficient of friction than said outer guide;
   at least one of said inner guide and said outer guide comprises a conveyor belt; and
   said wheel structure comprises at least one guide element being configured and disposed to be fastened between said first and said second elongated members.

* * * * *